United States Patent
Ninomiya et al.

(10) Patent No.: US 6,232,382 B1
(45) Date of Patent: May 15, 2001

(54) SAPONIFIED ETHYLENE-VINYL ACETATE COPOLYMER RESIN COMPOSITION AND LAMINATE HAVING A LAYER OF SAID RESIN COMPOSITION

(75) Inventors: Kenji Ninomiya; Koji Kita, both of Ibaraki; Makoto Kunieda, Kurashiki, all of (JP)

(73) Assignee: Nippon Gohsei Kagaku Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/164,566

(22) Filed: Oct. 1, 1998

(30) Foreign Application Priority Data

Oct. 2, 1997 (JP) .................................................. 9-287809

(51) Int. Cl.$^7$ ...................................................... C08K 5/04
(52) U.S. Cl. ............................................................ 524/400
(58) Field of Search ............................................. 524/400

(56) References Cited

U.S. PATENT DOCUMENTS

| | | | |
|---|---|---|---|
| 4,613,644 | * 9/1986 | Moritani | 524/430 |
| 5,118,743 | * 6/1992 | Yonezu | 524/287 |

FOREIGN PATENT DOCUMENTS 56-41204  4/1981  (JP) .

* cited by examiner

Primary Examiner—Paul R. Michl
(74) Attorney, Agent, or Firm—Armstrong, Westerman, Hattori, McLeland & Naughton LLP

(57) ABSTRACT

The saponified ethylene-vinyl acetate copolymer (EVOH) resin composition of the present invention is a composition comprising a saponified ethylene-vinyl acetate copolymer (EVOH) (A) having an ethylene content of 20–60 mole percent and a saponification degree of not less than 90 mole percent, magnesium acetate or/and calcium acetate (B) as an essential component and at least one of acetic acid (C), a boron compound (D) and sodium acetate (E) as an optional component, and is characterized in that the contents of the respective components in said composition, relative to 100 parts by weight of EVOH (A), are as follows: magnesium acetate or/and calcium acetate (B) 0.001–0.02 part by weight on the metal basis; acetic acid (C) 0–0.05 part by weight; the boron compound (D) 0–1 part by weight on the boron basis; and sodium acetate (E) 0–0.1 part by weight on the metal basis; and that the weight loss when said composition is maintained at a temperature $(T+70)°$ C. higher by 70 °C. than the melting point $T°$ C. of said EVOH (A) for 1 hour is not more than 10% by weight. The laminate of the present invention is characterized in that a layer of a thermoplastic resin is disposed at least one side of a layer consisting of the EVOH resin composition mentioned above.

4 Claims, No Drawings

SAPONIFIED ETHYLENE-VINYL ACETATE COPOLYMER RESIN COMPOSITION AND LAMINATE HAVING A LAYER OF SAID RESIN COMPOSITION

TECHNICAL FIELD

The present invention relates to a saponified ethylene-vinyl acetate copolymer (i.e. ethylene-vinyl alcohol copolymer; hereinafter abbreviated as EVOH") resin composition and a laminate having a layer of said resin composition.

PRIOR ART

EVOH is a resin very excellent in such properties as transparency, gas barrier property, aroma-retaining property, solvent resistance and oil resistance, among others. Making the best use of such characteristics, EVOH is molded into and used as films, sheets, or bottles or other containers for packaging foodstuffs, drugs, industrial chemicals, agrochemicals and the like.

EVOH is generally molded by melt molding and, by such molding, it is processed into such forms as films, sheets, bottles, cups, tubes, pipes and the like for putting to practical use. For EVOH, its molding processability (long-run moldability, appearance of moldings, etc.) is very important. In particular, in molding EVOH, it is often coextruded into laminates together with a substrate such as a polyolefin resin and an adhesive layer to provide the laminates with mechanical strength, moisture resistance and heat sealability, among others. Therefore, a low extent of odor emanation in the step of producing laminates from EVOH as well as interlayer adhesion is important.

Thus, in molding EVOH, the appearance of moldings (i.e. obtainability of moldings without fish eyes, striation or discoloration, among others), long-run processability in melt molding (i.e. obtainability of moldings without fish eyes or striation even in a long period of molding) and, further, low odor emanation from and interlayer adhesion of laminates should be fully satisfactory.

Various proposals have been made for improving the heat stability of EVOH. In Japanese Kokai Tokkyo Koho S51-91988, it is proposed that the sodium or potassium salt of an acid satisfying specific pKa conditions should be added. In Japanese Kokai Tokkyo Koho S56-41204, it is proposed that EVOH should contain calcium acetate or magnesium acetate in combination with a specific organic acid. In Japanese Kokai Tokkyo Koho S64-66262, an EVOH composition is proposed which contains a specific metal salt and two acidic substances and has a specific viscosity behavior. Japanese Kokai Tokkyo Koho H07-80954 describes an EVOH composition which contains a polymerization degree adjusting agent and satisfies a specific conditional formula concerning the change in viscosity average degree of polymerization in the step of heat treatment.

PROBLEMS WHICH THE INVENTION IS TO SOLVE

However, the market is demanding EVOH compositions of still higher quality. Detailed studies made by the present inventors have shown that the technologies disclosed in Japanese Kokai Tokkyo Koho's S51-91988, S56-41204 and H07-80954 still have room for improvement with respect to long-run moldability and that the technology disclosed in Japanese Kokai Tokkyo Koho S64-66262 shows a considerable improvement in long-run moldability but still has room for improvement concerning the odor of laminates and concerning interlayer adhesion.

OBJECTS OF THE INVENTION

Accordingly, it is an object of the present invention to provide an EVOH resin composition excellent in long-run moldability in the step of melt molding, hardly causing fish eye formation, striation, discoloration or the like, thus excellent in appearance characteristics, capable of giving laminates with reduced odor emanation and, further, excellent in interlayer adhesion. Another object is to provide a laminate having a layer of such resin composition.

SUMMARY OF THE INVENTION

The saponified ethylene-vinyl acetate copolymer (EVOH) resin composition of the present invention is a composition comprising a saponified ethylene-vinyl acetate copolymer (EVOH) (A) having an ethylene content of 20–60 mole percent and a saponification degree of not less than 90 mole percent, magnesium acetate or/and calcium acetate (B) as an essential component and at least one of acetic acid (C) a boron compound (D) and sodium acetate (E) as an optional component, and is characterized in that the contents of the respective components in said composition, relative to 100 parts by weight of EVOH (A), are as follows: magnesium acetate or/and calcium acetate (B) 0.001–0.02 part by weight on the metal basis; acetic acid (C) 0–0.05 part by weight; the boron compound (D) 0–1 part by weight on the boron basis; and sodium acetate (E) 0–0.1 part by weight on the metal basis; and that the weight loss when said composition is maintained at a temperature $(T+70)°$ C. higher by 70° C. than the melting point $T°$ C. of said EVOH (A) for 1 hour is not more than 10% by weight.

The laminate of the present invention is characterized in that a layer of a thermoplastic resin is disposed at least one side of a layer consisting of the EVOH resin composition mentioned above.

DETAILED DESCRIPTION OF THE INVENTION

In the following, the present invention is described in detail.

In accordance with the present invention, the EVOH (A) to be used has an ethylene content of 20–60 mole percent (preferably 25–55 mole percent) and a saponification degree of not less than 90 mole percent (preferably not less than 95 mole percent). If the ethylene content is lower than 20 mole percent, the gas barrier property will be low under high moisture conditions and the melt moldability also will be low. If, conversely, the ethylene content exceeds 60 mole percent, satisfactory gas barrier properties will not be obtained. If the degree of saponification is lower than 90 mole percent, decreased gas barrier property, heat stability and moisture resistance will result, hence the objects of the present invention cannot be attained.

As the EVOH (A), two or more EVOH species differing in composition may be used. In this case, by using a blend of EVOH species differing in ethylene content by not less than 5 mole percent and/or in saponification degree by not less than 1 mole percent, the fabrication qualities such as drawability in high-degree drawing, vacuum pressure forming or deep draw forming qualities, among others, can further be improved while retaining the gas barrier properties.

The above-mentioned EVOH (A) preferably has a melt index (MI) (210° C., load 2160 g) of 0.1–100 g/10 minutes (in particular 0.5–50 g/10 minutes). If the melt index is below this range, the extruder inside will reaches a high torque state in the step of molding and therefore the extrusion processing becomes difficult. If it is larger than said range, the mechanical strength of moldings will be insufficient.

Such EVOH (A) can be obtained by saponification of an ethylene-vinyl acetate copolymer. The ethylene-vinyl acetate copolymer can be produced by any of the known polymerization processes, for example suspension polymerization, emulsion polymerization or solution polymerization, among others. The saponification of the ethylene-vinyl acetate copolymer can be performed by the well-known method.

The EVOH may be "modified by copolymerization" with a small amount of one or more other comonomers selected from among α-olefins, unsaturated carboxylic acid compounds, unsaturated sulfonic acid compounds, (meth)acrylonitrile, (meth)acrylamide, vinyl ethers, vinylsilane compounds, vinyl chloride, styrene, polyoxyalkylene (meth)allyl ether, polyoxyalkylene (meth)acrylate, polyoxyalkylene (meth)acrylamide, polyoxyalkylene vinyl ether, polyoxyalkylene allylamine, polyoxyalkylene vinylamine and the like. It may be "post-modified" by urethane formation, acetalization or cyanethylation, for instance, within limits within which the effects of the present invention are not sacrificed.

In accordance with the present invention, the EVOH (A) contains, as an essential component, magnesium acetate or/and calcium acetate (B). In addition, it is preferred that it contain at least one of acetic acid (C), a boron compound (D) and sodium acetate (E) as an optional component.

The content of component (B), namely magnesium acetate or/and calcium acetate contained in EVOH (A) is 0.001–0.02 part by weight, preferably 0.0015–0.015 part by weight, more preferably 0.002–0.01 part by weight, calculated on the metal basis, namely as magnesium or calcium. If the content is less than 0.001 part by weight, the long-run quality will be low. If, conversely, it exceeds 0.02 part by weight, the discoloration and/or the odor emanation from moldings will be significant, or the interlayer adhesion will be low, hence the objects of the present invention will not be accomplished. This component (B) may comprise with magnesium acetate or calcium acetate, or both of magnesium acetate and calcium acetate.

The method of causing component (B) to be contained in EVOH (A) is not limited to any particular one but includes:
(1) the method comprising blending component (B) directly with EVOH (A);
(2) the method comprising dissolving component (B) in water or some other appropriate solvent, followed by admixing with EVOH (A):
(3) the method comprising immersing EVOH (A) in a solution of component (B):
(4) the method comprising blending component (B) with EVOH (A) in a molten state;
(5) the method comprising adding a solution of component (B) to a water/alcohol solution of EVOH (A), followed by precipitation in a coagulation vessel, further followed by drying of the resulting (porous) precipitate; and
(6) the method comprising immersing a porous precipitate from a water/alcohol solution of EVOH (A) in a solution of component (B), followed by drying, among others. From the viewpoint of uniform and efficient dispersion of component (B), however, the above-mentioned method 5 or 6 may suitably be employed.

The content of acetic acid (C), which may optionally be contained in the above-mentioned EVOH (A) is not more than 0.05 part by weight per 100 parts by weight of EVOH (A). Although acetic acid (C) is an optional component, it is desirably contained in an amount not less than 0.0005 part by weight. A preferred range is 0.0005–0.03 part by weight, and a more preferred range is 0.0005–0.01 part by weight. If the content of acetic acid (C) exceeds 0.05 part by weight, the long-run. quality will become low, hence the objects of the present invention will not be achieved.

The method of causing acetic acid (C) to be contained in EVOH (A) is not limited to any particular one, either, but the same methods as the methods 1–6 mentioned above may be employed. From the viewpoint of uniform and efficient dispersion of acetic acid (C), however, the above-mentioned method 5 or 6 is suitably employed.

As regards the adjustment of the content of acetic acid (C), it is also possible to adjust said content during the production of EVOH. For example, it is possible to adjust the amount of acetic acid (C) added for the purpose of neutralizing the alkali used in the step of saponification, by drying treatment, for instance.

As the boron compound (D) which may be contained in the above-mentioned EVOH, there may be mentioned boric acid, borax, or derivatives of these; halogenated boron compounds such as trichloroboron, or coordination compounds of these with ethers or amines; trialkyl- or triarylborons such as trimethylboron or triphenylboron, or coordination compounds of these; boric acid salts such as sodium tetraborate; and the like. Among these, boric acid and borax are used most preferably.

The content of the boron compound (D) is not more than 1 part, calculated as boron, by weight per 100 parts by weight of EVOH (A). Although the boron compound (D) is an optional component, it is desirable that it be contained in an amount, calculated as boron, of not less than 0.001 part by weight. A preferred range is 0.001–0.5 part by weight, and a more preferred range is 0.005–0.05 part by weight. If the content of boron compound (D) exceeds 1 part by weight on the boron basis, the moldings, such as films, will have a large number of fish eyes, hence the objects of the present invention will not be attained.

The method of causing the boron compound (D) to be contained in EVOH (A) is not limited to any particular one, either, but the same methods as the methods 1–6 mentioned above may be employed. From the viewpoint of uniform and efficient dispersion of boron compound (D), however, the above-mentioned method 5 or 6 is suitably employed.

The content of sodium acetate (D) which may be contained in the above-mentioned EVOH (A) is not more than 0.1 part by weight, calculated as the metal, per 100 parts by weight of EVOH (A). Although sodium acetate (D) is an optional component, it is desirable that it be contained in an amount of not less than 0.001 part by weight. A preferred range is 0.001–0.05 part by weight, and a more preferred range is 0.001–0.02 part by weight. If the content of sodium acetate (D) exceeds 0.1 part by weight, thermal degradation tends to occur, causing discoloration, in the step of melt molding, hence the objects of the present invention will not be achieved.

The method of causing sodium acetate (D) in the EVOH (A) is not limited to any particular one, either, but the same methods as the methods 1–6 mentioned above may be employed. From the viewpoint of uniform and efficient dispersion of sodium acetate (D), however, the above-mentioned method 5 or 6 is suitably employed.

As regards the adjustment of the content of sodium acetate (D), it is also possible to adjust it in the production of EVOH. Thus, for example, it is possible to neutralize the alkali (sodium hydroxide) used in the step of saponification with acetic acid and adjust the amount of the byproduct sodium acetate (D) by washing with water, for instance.

In accordance with the present invention, the desired resin composition can be obtained only by causing the above-mentioned EVOH to contain a specific amount of magnesium or/and calcium acetate (B) as an essential component and, if necessary, a specific amount of at least one of acetic acid (C), a boron compound (D) and sodium acetate (E) as an optional component. When these conditions are not satisfied, the objects of the present invention cannot be accomplished, as mentioned above.

While the EVOH resin composition of the present invention is obtained in the above manner, it is necessary, according to the present invention, that when said composition is maintained at a temperature (T+70)° C. higher by 70° C. than the melting point T° C. of EVOH (A) for 1 hour, the weight loss be not more than 10% by weight. If this weight loss exceeds 10% by weight, there is a tendency toward increased odor emanation from laminates and worsened interlayer adhesion.

The weight loss (%) as referred to herein is the value calculated according to the formula given below and can be determined by maintaining the sample at the above temperature for 1 hour under a nitrogen stream and conducting measurements using a TGA (thermogravimetric analyzer) (product of Perkin-Elmer).

Weight loss (%)=[(weight before heating−weight after heating)/(weight before heating)]×100

In cases where two or more EVOH species are used, the melting point of that EVOH species showing the highest weight proportion (if the weight ratio is 50/50, that EVOH component having the highest melting point) is regarded as the melting point T of EVOH (A) and the weight loss percentage is determined at a temperature higher by 70° C. than said melting point.

It is further preferred that the resin composition of the present invention satisfy, in addition to the conditions, the following conditions:
(i) that the relation between the time of heating at a temperature (T+40)° C. higher by 40° C. than the melting point T° C. of said EVOH (A) and the apparent melt viscosity at a shear rate of 100 sec$^{-1}$ is such that when said composition is heated at the temperature (T+40)° C., the apparent melt viscosity continues to increase until hour 1 and the apparent melt viscosity after 1 hour is within the range of 1.05–2 times the apparent melt viscosity after 5 minutes and
(ii) that the relation between the time of heating at the temperature (T+70)° C. higher by 70° C. than the melting point T° C. of said EVOH (A) and the apparent melt viscosity at a shear rate of 100 sec$^{-1}$ is such that when said composition is heated at the temperature (T+70)° C., the apparent melt viscosity shows a maximum value within 1 hour and the apparent melt viscosity after 1 hour is within the range of 0.05–1.5 times the apparent melt viscosity after 5 minutes. This is because, when these conditions are satisfied, it becomes possible to achieve and enjoy the effects and advantages of the present invention more remarkably.

The apparent melt viscosity at a shear rate of 100 sec$^{-1}$ as referred to herein can be determined by using a CAPIROGRAPH (product of Toyo Seiki K.K.) with a capillary having a diameter of 1 mm and a length of 10 mm and measuring apparent melt viscosities at several shear rate points in the vicinity of 100 sec$^{-1}$, followed by interpolation of the curve showing the relation between the shear rate and said viscosity.

Referring to (i), when the apparent melt viscosity fails to continue to increase until hour 1 upon heating at the temperature (T+40)° C., a tendency is observed toward worsening with respect to the odor and interlayer adhesion of laminates. When the apparent melt viscosity after 1 hour exceeds twice the apparent melt viscosity after 5 minutes upon heating at the temperature (T+40)° C., there is a tendency toward insufficient long-run moldability. When it is less than 1.05 times, there is a tendency toward insufficient interlayer adhesion in the case of laminates.

Referring to (ii), when, upon heat at the temperature (T+70)° C., the apparent melt viscosity fails to show a maximum value within 1 hour but continues to still increase after hour 1, there is a tendency toward insufficient long-run moldability. When, upon heating at the temperature (T+70)° C., the apparent melt viscosity after 1 hour is less than 5/100 of the apparent melt viscosity after 5 minutes, there is a tendency toward worsened odor and interlayer adhesion qualities of laminates. When it exceeds 1.5 times, the long-run moldability tends to be insufficient.

In cases where two or more EVOH species are used, the melting point of that EVOH species showing the highest weight proportion (if the weight ratio is 50/50, that EVOH component having the highest melting point) is regarded as the melting point T of EVOH (A) and melt viscosity measurements are made at a temperature higher by 40° C. or 70° C. than T.

The method of controlling the above-mentioned weight loss or viscosity behavior is not limited to any particular one. It is important, however, to minimize the thermal history until obtaining the resin composition and it is particularly effective to adjust the temperature, time and oxygen concentration, among others, in the step of drying.

The resin composition of the present invention may further contain, as necessary, one or more of such additives as plasticizers, heat stabilizers, ultraviolet absorbers, antioxidants, colorants, antimicrobial agents, fillers and other resins. As gelation inhibitors, there may be added hydrotalcite compounds, heat stabilizers such as hindered phenols and hindered amines, metal salts of higher aliphatic carboxylic acids, etc.

The thus-obtained EVOH resin composition of the present invention is widely used for producing moldings. It is molded, by melt molding, for instance, into various shaped articles such as pellets, films, sheets, containers, fibers, rods, and tubes. Ground products derived from these (in the case of recycling recovered articles) or pellets may be used for melt molding again in many instances.

The method of melt molding mainly employed is the extrusion molding method (T-die extrusion, inflation extrusion, blow molding, melt spinning, contour extrusion, etc.) or the injection molding method. In many instances, the temperature of melt molding is selected within the range of 150–250° C.

While the EVOH resin composition of the present invention can be used in producing such moldings as mentioned above, it is preferably used in the form of laminates comprising a layer of a thermoplastic resin as disposed on at least one side of a layer of said resin composition, whereby laminates suited for practical use can be obtained.

Since said laminates comprise the EVOH resin composition of the present invention, they show very excellent effects regarding not only gas barrier property and transparency but also interlayer adhesion in the step of fabrication, such as high ratio drawing, vacuum pressure molding or deep draw forming.

In producing said laminates, another substrate material or other substrate materials are layered on one or both sides of a layer of the EVOH resin composition of the present invention. As the method of lamination to be employed on that occasion, there may be mentioned, for example, the method comprising melt-extruding a thermoplastic resin on films or sheets made of the EVOH resin composition of the present invention, the method comprising conversely melt-extruding the EVOH resin composition of the present invention on substrates made of a thermoplastic resin or the like, the method comprising coextruding the EVOH resin composition of the present invention and another thermoplastic resin and, further, the method comprising laminating a film or sheet of the EVOH resin composition of the present invention and a film or sheet of another substrate material using a known adhesive agent such as an organotitanium compound, isocyanate compound, polyester compound or polyurethane compound.

As the counterpart resin for use in coextrusion, there may be mentioned olefin homopolymers and copolymers such as linear low-density polyethylene, low-density polyethylene, medium-density polyethylene, high-density polyethylene, ethylene-vinyl acetate copolymer, ionomers, ethylene-propylene copolymer, ethylene-acrylate copolymer, polypropylene, propylene-α-olefin ($C_{4\text{-}20}$ α-olefin) copolymers, polybutene and polypentene, and polyolefin resins in a broader sense of the term, such as modifications of such olefin homopolymers or copolymers as derived by grafting of an unsaturated carboxylic acid or an ester thereof. Mention may also be made of polyesters, polyamides, copolyamides, polyvinyl chloride, polyvinylidene chloride, acrylic resins, polystyrene, vinyl ester resins, polyester elastomers, polyurethane elastomers, chlorinated polyethylene, chlorinated polypropylene and the like. Saponified ethylene-vinyl acetate copolymer (EVOH) is also coextrudable. Among the resins specifically mentioned above, polypropylene. polyamides, polyethylene, ethylene-vinyl acetate copolymer, polystyrene and polyesters are particularly suitable from the viewpoint of ease of film forming by coextusion and of practicability of physical properties (in particular strength) of films.

When films, sheets or like moldings are once produced from the EVOH resin composition of the present invention and then subjected to lamination by extrusion coating with another substrate material or lamination with a film, sheet or the like made of another substrate material using an adhesive, arbitrary substrate materials other than the thermoplastic resins mentioned above, for example paper, metal foils, uniaxially or biaxially oriented plastic films or sheets, woven fabrics, nonwoven fabrics, cotton-like metal products, wooden materials and the like, can also be used.

When a layer or layers of the EVOH resin composition obtained in accordance with the present invention is designated as X ($X_1$, $X_2$, . . . ) and a layer or layers of another substrate material, for example a thermoplastic resin layer as Y ($Y_1$, $Y_2$, . . . ), the layer constitution of the laminates includes, in the case of films, sheets and bottles, not only the two-layer structure X/Y but also other arbitrary possible combinations such as Y/X/Y, X/Y/X, $X_1$/$X_2$/Y, X/$Y_1$/$Y_2$, $Y_2$/$Y_1$/X/$Y_1$/$Y_2$, etc., and, in the case of filaments, arbitrary combinations of X and Y of the bimetal type, core (X)-sheath (Y) type, core (Y)-sheath (X) type or eccentric core-sheath type, for instance.

For coextruding or coinjecting the EVOH resin composition and another thermoplastic resin, it is necessary, in some cases, to use an interlayer adhesive. In that case, a thermoplastic resin modified with an ethylenically unsaturated carboxylic acid or the anhydride thereof is preferred as the interlayer adhesive. Suited as this modified thermoplastic resin layer are carboxyl-containing modified olefin polymers obtained by chemically (for example by copolymerization, addition reaction or grafting reaction) binding an ethylenically unsaturated carboxylic acid or the anhydride thereof to olefin polymers.

As said olefin polymers, there may be mentioned polyolefins such as polyethylene (low-pressure, medium-pressure, high-pressure), linear low-density polyethylene, polypropylene and polybutene, copolymers of an olefin and a comonomer copolymerizable with said olefin (e.g. vinyl ester, unsaturated carboxylic acid ester), for example ethylene-vinyl acetate copolymer, ethylene-ethyl acrylate copolymers and so on.

As said ethylenically unsaturated carboxylic acid or the anhydride thereof, there may be mentioned ethylenically unsaturated monocarboxylic acids, esters thereof, ethylenically unsaturated dicarboxylic acids, mono- or diesters thereof, and anhydrides thereof. Among these, ethylenically unsaturated dicarboxylic acid anhydrides are preferred. More specifically, there may be mentioned maleic acid, fumaric acid, itaconic acid, maleic anhydride, itaconic anhydride, maleic acid monomethyl ester, maleic acid monoethyl ester, maleic acid diethyl ester, fumaric acid monomethyl ester and the like. Among them, maleic anhydride is preferred.

The degree of modification (content resulting from copolymerization, addition or grafting) of the olefin polymers with the ethylenically unsaturated carboxylic acid or anhydride thereof is 0.01–15% by weight, preferably 0.02–10% by weight, based on the olefin polymers.

In the case of coextrusion, Y may be blended into X, or X may be blended into Y, or a resin capable of improving the adhesion of both layer surfaces to each other may be incorporated into at least one of X and Y.

In the practice of the present invention, the laminates mentioned above may be used as such in various forms or shapes. It is also preferred that said laminates be subjected to drawing treatment for improving the physical properties thereof. The laminates of the present invention show stretchability without allowing pinhole formation, cracking or delamination and are excellent in interlayer adhesion.

The drawing may be either uniaxial or biaxial. It is favorable for physical properties to perform drawing at a ratio as high as possible. According to the present invention, stretched films or stretched sheets are obtained without undergoing pinhole formation, cracking, uneven stretching, delamination and the like in the step of drawing. As the method of drawing, one capable of attaining a high ratio drawing can be selected from among the rolling, tentering, tubular drawing and blow drawing methods as well as the deep drawing, vacuum forming and other methods. In the case of biaxial drawing, either the simultaneous or the successive biaxial drawing method can be employed. The drawing temperature is selected within the range of 80–170° C., preferably 100–160° C.

After completion of the drawing, thermal fixation is generally carried out. The thermal fixation can be performed by a well-known method. Thus, the stretched films are heat-treated at 80–170° C., preferably 100–160° C., for about 2 to 600 seconds while maintaining them in a taut condition.

For use in heat-shrinking packaging of raw meat, processed meat, cheese or the like, the product films are not subjected to thermal fixation after drawing but, after packaging said raw meat, processed meat, cheese or the like with said films, subjected to heat treatment at 50–130° C., preferably 70–120° C., for about 2–300 seconds to thereby cause heat shrinking of said films for void space-free packaging.

The stretched films obtained may be subjected, as necessary, to such treatment as cooling, rolling, printing, dry lamination, solution or melt coating, bag making, deep drawing, box making, tube making, or splitting.

The thus-obtained laminates may have any arbitrary form or shape. Examples are films, sheets, tapes, bottles, pipes, filaments and profile extrudates. The laminates obtained may also be subjected, as necessary, to such treatment as heating, cooling, rolling, printing, dry lamination, solution or melt coating, bag making, deep drawing, box making, tube making, or splitting.

The thus-obtained films, sheets, containers and the like are useful as materials for packaging foodstuffs, drugs, industrial chemicals, agrochemicals and other various products to be packaged.

EXAMPLES

The following examples illustrate the present invention more specifically. In the following, unless otherwise specified, "part(s)" and "%" are on the weight basis. The unit of melt index (MI) is "g/10 minutes (210° C., load 2,160 g)".

Assay Methods

The acetic acid metal salts, acetic acid and boron compounds were assayed as follows.

Acetic acid metal salts: The resin composition was ashed, the ash was dissolved in aqueous hydrochloric acid, and Mg, Ca or Na was assayed by atomic absorption spectrometry.

Acetic acid: The resin composition was extracted with hot water, and acetic acid was assayed by neutralization titration of the extract with an alkali.

Boron compound: The resin composition was subjected to alkali fusion, followed by assaying boron by IPC (inductively coupled plasma) emission spectrochemical analysis.

Example 1

A porous precipitate (containing 100 parts of water per 100 parts of EVOH) from a water/methanol solution, as obtained after saponification, of EVOH (A) with an ethylene content of 35 mole percent, a saponification degree of 99.5 mole percent, an MI of 8 and a melting point of 178° C. was washed with 0.5% aqueous solution of acetic acid and then introduced into an aqueous solution containing 0.1% of acetic acid (C), 0.03% of magnesium acetate (B) and 0.02% of calcium acetate (B). The mixture was stirred at 30° C. for 5 hours, followed by 8 hours of drying at 110° C. under a nitrogen stream with an oxygen concentration of not more than 0.5%, to give an EVOH resin composition containing 0.01 part of acetic acid (C), 0.0035 part (as magnesium) of magnesium acetate (B) and 0.002 part (as calcium) of calcium acetate per 100 parts of EVOH (A).

The EVOH resin composition obtained was maintained (allowed to stand) at 248° C. (higher by 70° C. than the melting point 178° C. of EVOH (A)) for 1 hour. The weight loss was 1.3%.

This EVOH resin composition was heated at 218° C. (higher by 40° C. than the melting point 178° C. of EVOH (A)) for 1 hour. The apparent melt viscosity continued to increase, and the apparent melt viscosity after 1 hour was 1,200 Pa·sec and was 1.5 times the apparent melt viscosity after 5 minutes (780 Pa·sec).

Further, this EVOH resin composition was heated at 248° C. (higher by 70° C. than the melting point 178° C. of EVOH (A)) for not less than 1 hour (3 hours). The apparent melt viscosity showed a maximum value within 1 hour and then continued to decrease and the apparent melt viscosity after 1 hour was 59 Pa·sec and was $12/100$ of the apparent melt viscosity after 5 minutes (490 Pa·sec).

The EVOH resin composition obtained as mentioned above was then fed to a single-screw extruder equipped with a T die and molded into a 40-$\mu$m-thick film under the conditions mentioned below, and the appearance characteristics and long-run quality were evaluated in the following manner.

Film-producing Conditions on Single-screw Extruder

| | |
|---|---|
| Screw inside diameter | 40 mm |
| L/D | 28 |
| Screw compression ratio | 3.2 |
| T die | coathanger type |
| Die width | 450 mm |
| Extrusion temperature | $C_1$:200° C., H:220° C. |
| | $C_2$:220° C., D:220° C. |
| | $C_3$:220° C., |
| | $C_4$:220° C. |

(Appearance)

The appearance of the above film (10 cm×10 cm) just after formation was evaluated by the eye in terms of striation, fish eye formation and discoloration according to the following criteria.

(1) Striation
◯: No striation was observed.
Δ: Slight striation; but usable for practical purposes.
X: Striation of frequent occurrence; unusable for practical purposes.

(2) Fish eyes
⊚: 0–3
◯: 4–10
Δ: 11–50
X: 51 or more (3) Discoloration
◯: No discoloration was observed.
Δ: Slight discoloration; but usable for practical purpose.
X: Marked discoloration; unusable for practical purposes.

(Long-run quality)

The above-mentioned molding was continuously carried out for 10 days and the molded film obtained after 10 days was evaluated by the eye in terms of increases in striation, gelation, fish eye formation and discoloration according to the following criteria.

◯: No increases were observed.
Δ: Slight increases were observed; but continuous operation was possible.
X: Marked increases were observed; continuous operation was impossible.

Further, using the EVOH resin composition obtained, a multilayer laminate was produced by film forming using a feed block 5-layer T die to give a layer constitution of polypropylene layer/adhesive resin layer/EVOH resin composition layer/adhesive resin layer/polypropylene layer (the layer thicknesses being 100/25/50/25/100 $\mu$m in that order). The polypropylene used had an MI of 1.2 g/10 minutes and the adhesive resin used was maleic anhydride-modified polypropylene having an MI of 2.6 g/10 minutes.

The multilayer laminate obtained was evaluated for odor and interlayer adhesion as follows.

(Odor)

The multilayer film obtained was tested by 30 panelists as to whether it had odor or not, and evaluated according to the following criteria.

○: All 30 panelists judged it as having no odor.
Δ: 5 or more of 30 panelists felt odor but judged as usable for practical purposes.
X: All 30 panelists felt odor and judges as unusable for practical purposes.

(Interlayer adhesion)

The bonding strength between the EVOH resin composition layer and adhesive layer of the above multilayer film was measured by the T peel method using an autograph at 20° C. and a pulling rate of 300 m/minute, and evaluated according to the following criteria.

○: Not less than 700 g/15 mm.
Δ: Not less than 300 g/15 mm but less than 700 g/15 mm.
X: Less than 300 g/15 mm.

Example 2

EVOH (A) having an ethylene content of 40 mole percent, a saponification degree of 99.0 mole percent, an MI of 3 and a melting point of 170° C. was introduced into an aqueous solution containing 0.09% of acetic acid (C) and 0.04% of magnesium acetate (B), and the mixture was stirred at 30° C. for 4 hours, followed by 9 hours of drying at 110° C. in a nitrogen stream with an oxygen content of not more than 0.5, to give an EVOH resin composition containing 0.009 part of acetic acid (C) and 0.0045 part (as magnesium) of magnesium acetate per 100 parts of EVOH (A). This composition was evaluated in the same manner as in Example 1.

When the EVOH resin composition obtained was maintained (allowed to stand) at 240° C. (higher by 70° C. than the melting point 170° C. of EVOH (A)) for 1 hour, the weight loss was 1.5%.

When this resin composition was continuously heated at 210° C. (higher by 40° C. than the melting point 170° C. of EVOH (A)) for 1 hour, the apparent melt viscosity continued to increase and the apparent melt viscosity after 1 hour was 2,500 Pa·sec and thus was 1.4 times the apparent melt viscosity after 5 minutes (1,800 Pa·sec).

Further, this resin composition was heated at 240° C. (higher by 70° C. than the melting point 170° C. of EVOH (A)) for not less than 1 hour (3 hours). The apparent melt viscosity showed a maximum value within 1 hour and thereafter continued to decrease and the apparent melt viscosity after 1 hour was 89 Pa·sec and was $9/100$ of the apparent melt viscosity after 5 minutes (990 Pa·sec).

The film-forming conditions employed were as follows.

Film-forming Conditions on Single-screw Extruder

| | |
|---|---|
| Screw inside diameter | 40 mm |
| L/D | 28 |
| Screw compression ratio | 3.2 |
| T die | coathanger type |
| Die width | 450 mm |
| Extrusion temperature | $C_1$:180° C., H:210° C. |
| | $C_2$:200° C., D:210° C. |
| | $C_3$:210° C., |
| | $C_4$:210° C. |

Example 3

An EVOH resin composition containing 0.009 part of acetic acid (C) and 0.0065 part (as calcium) of calcium acetate (B) per 100 parts of EVOH (A) was obtained and evaluated in the same manner as in Example 2 except that 0.06 of calcium acetate (B) was used in lieu of 0.04 of magnesium acetate.

When the EVOH resin composition obtained was maintained (allowed to stand) at 240° C. (higher by 70° C. than the melting point 170° C. of EVOH (A)) for 1 hour, the weight loss was 1.9%.

When this resin composition was continuously heated at 210° C. (higher by 40° C. than the melting point 170° C. of EVOH (A)) for 1 hour, the apparent melt viscosity continued to increase and the apparent melt viscosity after 1 hour was 2,150 Pa·sec and thus was 1.2 times the apparent melt viscosity after 5 minutes (1. 800 Pa·sec).

Further, this resin composition was heated at 240° C. (higher by 70° C. than the melting point 170° C. of EVOH (A)) for not less than 1 hour (5 hours). The apparent melt viscosity showed a maximum value within 1 hour and thereafter continued to decrease and the apparent melt viscosity after 1 hour was 300 Pa·sec and was $30/100$ of the apparent melt viscosity after 5 minutes (990 Pa·sec).

Example 4

An EVOH resin composition containing 0.006 part of acetic acid (C), 0.0015 part (as magnesium) of magnesium acetate (B) and 0.0045 part (as calcium) of calcium acetate (B) per 100 parts of EVOH (A) was obtained in the same manner as in Example 2 by introducing the EVOH into an aqueous solution containing 0.05% of acetic acid (C), 0.015% of magnesium acetate (B) and 0.04% of calcium acetate (B) and stirring the mixture at 35° C. for 3 hours, followed by 8 hours of drying at 110° C. under a nitrogen stream with an oxygen concentration of not more than 0.5%. The composition was evaluated in the same manner.

When the EVOH resin composition obtained was maintained (allowed to stand) at 240° C. (higher by 70° C. than the melting point 170° C. of EVOH (A)) for 1 hour, the weight loss was 2.2%.

When this resin composition was continuously heated at 210° C. (higher by 40° C. than the melting point 170° C. of EVOH (A)) for 1 hour, the apparent melt viscosity continued to increase and the apparent melt viscosity after 1 hour was 2,200 Pa·sec and thus was 1.2 times the apparent melt viscosity after 5 minutes (1,800 Pa·sec).

Further, this resin composition was heated at 240t (higher by 70° C. than the melting point 170° C. of EVOH (A)) for not less than 1 hour (5 hours). The apparent melt viscosity showed a maximum value within 1 hour and thereafter continued to decrease and the apparent melt viscosity after 1 hour was 200 Pa·sec and was $20/100$ of the apparent melt viscosity after 5 minutes (990 Pa·sec).

Example 5

An EVOH resin composition containing 0.006 part of acetic acid (C), 0.0015 part (as magnesium) of magnesium acetate (B) and 0.0045 part (as calcium) of calcium acetate (B) per 100 parts of EVOH (A) was obtained in the same manner as in Example 4 except that a mixture of an EVOH species ($A_1$) having an ethylene content of 32 mole percent, a saponification degree of 99.5 mole percent, an MI of 12 and a melting point of 183° C. and another EVOH species ($A_2$) having an ethylene content of 42 mole percent, a saponification degree of 99.6 mole percent, an MI of 15 and a melting point of 167° C. in a mixing ratio ($A_1/A_2$) of 70/30 by weight was used as EVOH (A). The composition was evaluated in the same manner.

When the EVOH resin composition obtained was maintained (allowed to stand) at 253° C. (higher by 70° C. than the melting point 183° C. of EVOH ($A_1$)) for 1 hour, the weight loss was 2.6%.

When this resin composition was continuously heated at 223° C. (higher by 40° C. than the melting point 183° C. of EVOH ($A_1$)) for 1 hour, the apparent melt viscosity continued to increase and the apparent melt viscosity after 1 hour was 790 Pa·sec and thus was 1.5 times the apparent melt viscosity after 5 minutes (520 Pa·sec).

Further, this resin composition was heated at 253° C. (higher by 70° C. than the melting point 183° C. of EVOH ($A_1$)) for not less than 1 hour (5 hours). The apparent melt viscosity showed a maximum value within 1 hour and thereafter continued to decrease and the apparent melt viscosity after 1 hour was 35 Pa·sec and was 15/100 of the apparent melt viscosity after 5 minutes (230 Pa·sec).

The film-forming conditions employed were as follows.

Film-forming Conditions on Single-screw Extruder

| Screw inside diameter | 40 mm |
|---|---|
| L/D | 28 |
| Screw compression ratio | 3.7 |
| T die | coathanger type |
| Die width | 450 mm |
| Extrusion temperature | $C_1$:200° C., H:220° C. |
|  | $C_2$:220° C., D:220° C. |
|  | $C_3$:225° C., |
|  | $C_4$:225° C. |

Example 6

An EVOH resin composition containing 0.006 part of acetic acid (C), 0.0015 part (as magnesium) of magnesium acetate (B) and 0.0045 part (as calcium) of calcium acetate (B) per 100 parts of EVOH (A) was obtained in the same manner as in Example 4 except that a mixture of an EVOH species ($A_1$) having an ethylene content of 32 mole percent, a saponification degree of 99.5 mole percent, an MI of 12 and a melting point of 183° C. and another EVOH species ($A_2$) having an ethylene content of 47 mole percent, a saponification degree of 97 mole percent, an MI of 15 and a melting point of 142° C. in a mixing ratio ($A_1/A_2$) of 80/20 by weight was used as EVOH (A). The composition was evaluated in the same manner.

When the EVOH resin composition obtained was maintained (allowed to stand) at 253° C. (higher by 70° C. than the melting point 183° C. of EVOH ($A_1$)) for 1 hour, the weight loss was 2.6%.

When this resin composition was continuously heated at 223° C. (higher by 40° C. than the melting point 183° C. of EVOH ($A_1$)) for 1 hour, the apparent melt viscosity continued to increase and the apparent melt viscosity after 1 hour was 820 Pa·sec and thus was 1.5 times the apparent melt viscosity after 5 minutes (540 Pa·sec).

Further, this resin composition was heated at 253° C. (higher by 70° C. than the melting point 183° C. of EVOH ($A_1$)) for not less than 1 hour (3 hours). The apparent melt viscosity showed a maximum value within 1 hour and thereafter continued to decrease and the apparent melt viscosity after 1 hour was 50 Pa·sec and was 20/100 of the apparent melt viscosity after 5 minutes (240 Pa·sec).

The film-forming conditions employed were the same as those in Example 5.

Comparative Example 1

An EVOH resin composition containing 0.09 part of acetic acid (C), 0.0035 part (as magnesium) of magnesium acetate (B) and 0.002 part (as calcium) of calcium acetate (B) per 100 parts of EVOH (A) was obtained in the same manner as in Example 1 except that the concentration of acetic acid in the aqueous solution was made 1%. The composition was evaluated in the same manner.

When this EVOH resin composition was maintained at T+70° C. (248° C.) for 1 hour, the weight loss was 1.4%.

When this EVOH resin composition was continuously heated at T+40° C. (218° C.) for 1 hour, the apparent melt viscosity continued to increase and the apparent melt viscosity after 1 hour was 2.200 Pa·sec and thus was 2.7 times the apparent melt viscosity after 5 minutes (820 Pa·sec).

When this EVOH resin composition was continuously heated at T+70° C. (248° C.) for 1 hour, the apparent melt viscosity showed a maximum value within 1 hour and thereafter continued to decrease and the apparent melt viscosity after 1 hour was 320 Pa·sec and was 60/100 of the apparent melt viscosity after 5 minutes (510 Pa·sec).

Comparative Example 2

An EVOH resin composition containing 0.01 part of acetic acid (C), 0.0003 part (as magnesium) of magnesium acetate (B) and 0.0004 part (as calcium) of calcium acetate (B) per 100 parts of EVOH (A) was obtained in the same manner as in Example 1 except that the concentrations of magnesium acetate (B) and calcium acetate (B) in the aqueous solution were each made 0.005%. The composition was evaluated in the same manner.

When this EVOH resin composition was maintained at T+70° C. (248° C.) for 1 hour, the weight loss was 0.6%.

When this EVOH resin composition was continuously heated at T+40° C. (218° C.) for 1 hour, the apparent melt viscosity continued to increase and the apparent melt viscosity after 1 hour was 1,020 Pa·sec and thus was 1.3 times the apparent melt viscosity after 5 minutes (780 Pa·sec).

When this EVOH resin composition was continuously heated at T+70° C. (248° C.) for 1 hour, the apparent melt viscosity continued to increase and the apparent melt viscosity after 1 hour was 1,570 Pa·sec and was 3.2 times the apparent melt viscosity after 5 minutes (490 Pa·sec).

Comparative Example 3

An EVOH resin composition containing 0.01 part of acetic acid (C), 0.01 part (as magnesium) of magnesium acetate (B) and 0.015 part (as calcium) of calcium acetate (B) per 100 parts of EVOH (A) was obtained in the same manner as in Example 1 except that the concentrations of magnesium acetate (B) and calcium acetate (B) in the aqueous solution were made 0.1% and 0.15%, respectively. The composition was evaluated in the same manner.

When this EVOH resin composition was maintained at T+70° C. (248° C.) for 1 hour, the weight loss was 22%.

When this EVOH resin composition was continuously heated at T+40° C. (218° C.) for 1 hour, the apparent melt viscosity showed a maximum value within 1 hour and thereafter continued to decrease and the apparent melt viscosity after 1 hour was 220 Pa·sec and thus was 30/100 of the apparent melt viscosity after 5 minutes (780 Pa·sec).

When this EVOH resin composition was continuously heated at T+70° C. (248° C.) for 1 hour, the apparent melt viscosity showed a maximum value within 1 hour and thereafter continued to decrease and the apparent melt viscosity after 1 hour was less than 10 Pa·sec (unmeasurable) and thus was 2/100 of the apparent melt viscosity after 5 minutes (490 Pa·sec).

Summary of Results

The evaluation results obtained in Examples 1–6 and Comparative Examples 1–3 are summarized in Table 1. In Table 1, (1) refers to striation, (2) for fish eye formation and (3) for discoloration.

TABLE 1

|  | Appearance | | | Long-run | | Interlayer |
| --- | --- | --- | --- | --- | --- | --- |
|  | (1) | (2) | (3) | quality | Odor | adhesion |
| Example 1 | ○ | ⊚ | ○ | ○ | ○ | ○ |
| Example 2 | ○ | ⊚ | ○ | ○ | ○ | ○ |
| Example 3 | ○ | ⊚ | ○ | ○ | ○ | ○ |
| Example 4 | ○ | ⊚ | ○ | ○ | ○ | ○ |
| Example 5 | ○ | ⊚ | ○ | ○ | ○ | ○ |
| Example 6 | ○ | ⊚ | ○ | ○ | ○ | ○ |
| Compar. Ex. 1 | Δ | ○ | ○ | X | ○ | ○ |
| Compar. Ex. 2 | ○ | ⊚ | ○ | X | ○ | Δ |
| Compar. Ex. 3 | ○ | ⊚ | Δ | ○ | x | x |

Example 7

A pressure reaction vessel was charged with 1,000 parts of a 40% methanol solution of an ethylene-vinyl acetate copolymer with an ethylene content of 32 mole percent, and the contents were heated at 110° C. with agitation. Then, saponification was carried out for 2.5 hours by continuously feeding 40 parts of a 6% methanol solution of sodium hydroxide and 2,500 parts of methanol while the the byproduct methyl acetate and the excess methanol were distilled off from the system, to give EVOH with a degree of saponification of the vinyl acetate component of 99.8 mole percent. A water/methanol solution of said EVOH was extruded in a strand form into a coagulation bath, whereby pellets A were produced.

Then, 100 parts of the pellets A were immersed in 300 parts of 0.3% aqueous acetic acid and the mixture was stirred at 30 for 1 hour. Washing with said aqueous acetic acid was repeated once more. Water (300 parts) was added to the pellets obtained after the washing, and the mixture was stirred at 30° C. for 1 hour.

This washing with water was repeated twice more, and the pellets were filtered off.

Then, the pellets obtained in the above manner were immersed in a deionized water containing 0.052% of boric acid (D), 0.025% of sodium acetate (E) and 0.007% of magnesium acetate (B). The pellets were then recovered by filtration and dried at 120° C. for 24 hours to give pellets B.

The thus-obtained EVOH resin composition (pellets B) contained 0.031 part (as boron) of boric acid (D), 0.0093 part (as metal) of sodium acetate (E) and 0.0022 part (as metal) of magnesium acetate (B) per 100 parts of EVOH (A).

The EVOH resin composition (pellets B) obtained was subjected to film forming under the conditions mentioned below. The film obtained had a width of 300 mm and a thickness of 30 μm. The film production was carried out continuously for 144 hours. The films thus obtained were evaluated by the methods mentioned below. The results are shown in Table 3.

| Extruder | 40 mm φ extruder |
| --- | --- |
| Screw | L/D = 28, compression ratio 3.5 |
| Die | manifold type |
| Extrusion temperatures | $C_1$:180° C., $C_2$:210° C., $C_3$:230° C., $C_4$:230° C. |
| Discharge | 1.5 kg/hr |

(1) Fish eye formation

At 1 hour and 144 hours after the start of film forming, the number of fish eyes not smaller than 100 μm in diameter per 100 cm² was determined.

(2) Transparency

Twenty films (10 cm×10 cm) obtained after 144 hours were placed on one another and the state of discoloration of the edge portion was evaluated according to the following criteria.

○: No discoloration.
Δ: Slight yellowing.
X: Yellowing.

(3) Striation

The number of striate on a film (10 cm x 10 cm) obtained after 144 hours was determined for evaluation according to the following criteria.

○: No striation.
Δ: A small number of striate.
X: Many striate.

Then, using the EVOH resin composition obtained (pellets B), a multilayer film comprising the EVOH resin composition as the intermediate layer, a maleic anhydride-modified polyethylene as the adhesive layer and low-density polyethylene as the inner and the outer layer was produced by coextrusion using the same apparatus as used in the film production mentioned above, with the die temperature and resin temperature adjusted to 200° ° C. After 20 hours, the EVOH resin composition layer was evaluated for gel-like hard spots according to the following criteria.

(4) Evaluation concerning gel-like hard spots

○: No gel-like hard spots.
X: Gel-like hard spots were observed.

Examples 8–10 and Comparative Examples 4–7

EVOH resin compositions (pellets B) specified in Table 2 were obtained in the same manner as in Example 7 while adequately controlling the concentrations of boric acid (D), sodium acetate (E) and magnesium acetate (B) in the aqueous solution, and they were evaluated in the same manner as in Example 7. The results are shown in Table 3.

Conditions and Results Summarized

The conditions of Examples 7–10 and Comparative Examples 4–7 are summarized in Table 2, and the evaluation results in Table 3.

TABLE 2

| | Components contained (parts) | | | | Weight loss | T + 40° C. | T + 70° C. |
|---|---|---|---|---|---|---|---|
| | $H_3BO_3$ | NaOAc | $Mg(OAc)_2$ | AcOH | (%) | η 60/5 | η 60/5 |
| Example 7 | 0.031 | 0.0093 | 0.0022 | 0.0011 | 2.1 | 1.6 | 0.1 |
| Example 8 | 0.044 | 0.0145 | 0.0013 | 0.0010 | 1.2 | 1.7 | 0.4 |
| Example 9 | 0.012 | 0.0108 | 0.0035 | 0.0012 | 1.4 | 1.2 | 0.8 |
| Example 10 | 0.031 | 0.0021 | 0.0022 | 0.0010 | 1.7 | 0.3 | 0.2 |
| Comp. Ex. 4 | 1.1 | 0.0093 | 0.0022 | 0.0011 | 1.9 | 1.7 | 0.1 |
| Comp. Ex. 5 | 0.031 | 0.120 | 0.0022 | 0.0012 | 3.4 | 1.5 | 0.1 |
| Comp. Ex. 6 | 0.031 | 0.0093 | 0.0005 | 0.0011 | 0.9 | 1.5 | 2.1 |
| Comp. Ex. 7 | 0.031 | 0.0093 | 0.120 | 0.0012 | 37 | <0.02 | <0.02 |

(Note 1)
$H_3BO_3$ stands for boric acid (number of parts as boron), NaOAc for sodium acetate (number of parts as metal), $Mg(OAc)_2$ for magnesium acetate (number of parts as metal), and AcOH for acetic acid (number of parts), each per 100 parts of EVOH.
(Note 2)
The EVOH used in Example 9 had an ethylene content of 44 mole percent, a saponification degree of 99.8 mole percent, an MI of 12 and a melting point of 164° C., and the EVOH used in Examples 7, 8 and 10 and Comparative Examples 4–7 had an ethylene content of 32 mole percent, a saponification degree of 99.8 mole percent, an MI of 3 and a melting point of 183° C.
(Note 3)
The weight loss (%) was determined after maintaining (allowing to stand) each EVOH resin composition at a temperature higher by 70° C. than the melting point of EVOH for 1 hour.
(Note 4)
"T + 40° C. η 60/5" denotes the ratio (apparent melt viscosity after 1 hour) (apparent melt viscosity after 5 minutes) when heating of the resin cocmposition at a temperature higher by 4° C. than the melting point of EVOH was continued for 1 hour. In Examples 7–10 and Comparative Examples 4–6, the apparent melt viscosity continued to increase during the one-hour heating at that temperature. In Comparative Example 7, the apparent melt viscosity showed a maximum within 1 hour and thereafter continued to decrease.
(Note 5)
"T + 70° C. η 60/5" denotes the ratio (apparent melt viscosity after 1 hour)/(apparent melt viscosity after 5 minutes) when heating of the resin composition at a temperature higher by 70° C. than the melting point of EVOH was continued for 1 hour. In Examples 7–10 and Comparative Examples 4, 5 and 7, the apparent melt viscosity showed a maximum within 1 hour and thereafter continued to decrease. In Comparative Example 6, the apparent melt viscosity continued to increase during the one-hour heating at that temperature.

TABLE 3

| | (1) Fish eye formation | | (2) | (3) | (4) |
|---|---|---|---|---|---|
| | After 1 hr | After 144 hrs. | Transparency | Striation | Gel-like hard spots |
| Example 7 | 0.3 | 0.5 | ○ | ○ | ○ |
| Example 8 | 0.4 | 0.4 | ○ | ○ | ○ |
| Example 9 | 0.2 | 0.3 | ○ | ○ | ○ |
| Example 10 | 1.6 | 1.8 | ○ | ○ | ○ |
| Comp. Ex. 4 | 122 | 130 | ○ | ○ | X |
| Comp. Ex. 5 | 0.4 | 0.7 | X | ○ | ○ |
| Comp. Ex. 6 | 0.4 | 10 | ○ | ○ | ○ |
| Comp. Ex. 7 | # | # | | | |

(Note)
The viscosity at the time of melt molding was too low to give any film.

EFFECTS OF THE INVENTION

The EVOH resin composition of the present invention comprises EVOH containing specific components (magnesium acetate or/and calcium acetate as essential component and at least one selected from among acetic acid, boron compounds and sodium acetate as optional component) in respective specific amounts. When maintained at a temperature higher by 70° C. than the melting of the EVOH for 1 hour, it shows a weight loss of not more than 10% by weight. Since an EVOH preferably having a specific viscosity behavior is used therein, the composition is excellent in long-run quality in the step of melt molding and allows only a slight extent of fish eye formation, striation or discoloration, giving moldings excellent in appearance characteristics. Furthermore, when the moldings are processed into laminates, reduced odor emanation results. Even after such a fabrication step as stretching or deep drawing, the laminates are excellent in interlayer adhesion. Thus, various laminates can be produced. Therefore, the moldings and laminates obtained from the EVOH resin composition of the present invention are very useful in such fields of application as films, sheets, tubes, bags, containers and the like for packaging foodstuffs, drugs, agrochemicals and industrial chemicals.

What is claimed is:
1. A method of producing a saponified ethylene-vinyl acetate copolymer resin composition which comprises
    drying a mixture of resin composition composed of a saponified ethylene-vinyl acetate copolymer (EVOH) (A) including the below-described components in a nitrogen stream in at least part of a drying process to obtain the following resin composition which comprises
    a saponified ethylene-vinyl acetate copolymer (EVOH) (A) having an ethylene content of 20–60 mole percent and a saponification degree of not less than 90 mole percent,
    magnesium acetate and/or calcium acetate (B) and acetic acid (C) as essential components and
    at least one of a boron compound (D) and sodium acetate (E) as an optional component,
    the contents of the respective components in said composition, relative to 100 parts by weight of EVOH (A), being as follows:

magnesium acetate and/or calcium acetate (B) 0.001–0.02 part by weight on the metal basis;

acetic acid (C) 0.0005–0.006 part by weight;

the boron compound (D) 0–1 part by weight on the boron basis; and sodium acetate (E) 0–0.1 part by weight on the metal basis;

and that the weight loss when said composition is maintained at a temperature (T+70)° C. higher by 70° C. than the melting point T° C. of said EVOH (A) for 1 hour is not more than 10% by weight, wherein the relation between the time of heating at a temperature (T+40)° C. higher by 40° C. than the melting point T° C. of said EVOH (A) and the apparent melt viscosity at a shear rate of 100 sec$^{-1}$ is such that when said composition is heated at the temperature (T+40)° C. the apparent melt viscosity continues to increase until hour 1 and the apparent melt viscosity after 1 hour is within the range of 1.05–2 times the apparent melt viscosity after 5 minutes, and wherein the relation between the time of heating at the temperature (T+70)° C. than the melting point T° C. of said EVOH (A) and the apparent melt viscosity at a shear rate of 100 sec$^{-1}$ is such that when said composition is heated at the temperature (T+70)° C., the apparent melt viscosity shows a maximum value within 1 hour and the apparent melt viscosity after 1 hour is within the range of 0.05–1.5 times the apparent melt viscosity after 5 minutes.

2. A method of producing a saponified ethylene-vinyl acetate copolymer resin composition as claimed in claim 1, wherein the content of the boron compound (C) per 100 parts by weight of EVOH (A) in said composition is 0.001–1 part by weight.

3. A method of producing a laminate comprising a layer of a saponified ethylene-vinyl acetate copolymer resin composition and a layer of a thermoplastic resin as disposed on at least one side of the former, which comprises drying a mixture of resin composition composed of a saponified ethylene-vinyl acetate copolymer (EVOH) (A) including the below-described components in a nitrogen stream in at least part of a drying process to obtain the following resin composition which comprises said saponified ethylene-vinyl acetate copolymer resin composition comprising a saponified ethylene-vinyl acetate copolymer (EVOH) (A) having an ethylene content of 20–60 mole percent and a saponification degree of not less than 90 mole percent, magnesium acetate and/or calcium acetate (B) and acetic acid (C) as essential components and at least one of a boron compound (D) and sodium acetate (E) as an optional component, the contents of the respective components in said composition, relative to 100 parts by weight of EVOH (A), being as follows:

magnesium acetate and/or calcium acetate (B) 0.001–0.02 part by weight on the metal basis;

acetic acid (C) 0–0.05 part by weight;

the boron compound (D) 0–1 part by weight on the boron basis; and sodium acetate (E) 0–0.1 part by weight on the metal basis;

and that the weight loss when said composition is maintained at a temperature (T+70)° C. higher by 70° C. than the melting point T° C. of said EVOH (A) for 1 hour being not more than 10% by weight, wherein the relation between the time of heating at a temperature (T+40)° C. higher by 40° C. than the melting point T° C. of said EVOH (A) and the apparent melt viscosity at a shear rate of 100 sec$^{-1}$ is such that when said composition is heated at the temperature (T+40)° C., the apparent melt viscosity continues to increase until hour 1 and the apparent melt viscosity after 1 hour is within the range of 1.05–2 times the apparent melt viscosity after 5 minutes, and wherein the relation between the time of heating at the temperature (T+70)° C. than the melting point T° C. of said EVOH (A) and the apparent melt viscosity at a shear rate of 100 sec$^{-1}$ is such that when said composition is heated at the temperature (T+70)° C., the apparent melt viscosity shows a maximum value within 1 hour and the apparent melt viscosity after 1 hour is within the range of 0.05–1.5 times the apparent melt viscosity after 5 minutes, and laminating a layer of a thermoplastic resin on one or both sides of a layer of said resin composition.

4. A method of producing a shaped article comprising a saponified ethylene-vinyl acetate copolymer resin composition which comprises drying a mixture of resin composition composed of a saponified ethylene-vinyl acetate copolymer (EVOH) (A) including the below-described components in a nitrogen stream in at least part of a drying process to obtain the following resin composition which comprises a saponified ethylene-vinyl acetate copolymer (EVOH) (A) having an ethylene content of 20–60 mole percent and a saponification degree of not less than 90 mole percent, magnesium acetate and/or calcium acetate (B) and acetic acid (C) as essential components and at least one of a boron compound (D) and sodium acetate (E) as an optional component, the contents of the respective components in said composition, relative to 100 parts by weight of EVOH (A), being as follows:

magnesium acetate and/or calcium acetate (B) 0.001–0.02 part by weight on the metal basis;

acetic acid (C) 0.0005–0.006 part by weight;

the boron compound (D) 0–1 part by weight on the boron basis; and sodium acetate (E) 0–0.1 part by weight on the metal basis;

and that the weight loss when said composition is maintained at a temperature (T+70)° C. higher by 70° C. than the melting point T° C. of said EVOH (A) for 1 hour is not more than 10% by weight, wherein the relation between the time of heating at a temperature (T+40)° C. higher by 40° C. than the melting point T° C. of said EVOH (A) and the apparent melt viscosity at a shear rate of 100 sec$^{-1}$ is such that when said composition is heated at the temperature (T+40)° C., the apparent melt viscosity continues to increase until hour 1 and the apparent melt viscosity after 1 hour is within the range of 1.05–2 times the apparent melt viscosity after 5 minutes, and wherein the relation between the time of heating at the temperature (T+70)° C. than the melting point T° C. of said EVOH (A) and the apparent melt viscosity at a shear rate of 100 sec$^{-1}$ is such that when said composition is heated at the temperature (T+70)° C., the apparent melt viscosity shows a maximum value within 1 hour and the apparent melt viscosity after 1 hour is within the range of 0.05–1.5 times the apparent melt viscosity after 5 minutes, and melt molding said resin composition to produce a shaped article.

\* \* \* \* \*